US012803946B2

(12) United States Patent
Suri et al.

(10) Patent No.: US 12,803,946 B2
(45) Date of Patent: Nov. 17, 2026

(54) EMAIL SYSTEM DYNAMIC EXTENSION CREATION VIA PROGRAMMATIC INTERFACES

(71) Applicant: Microsoft Technology Licensing, LLC, Redmond, WA (US)

(72) Inventors: Prakash Ajay Kumar Suri, Bengaluru (IN); Padmanabhan Sundararajan, Bengaluru (IN); Sayan Chaliha, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 18/891,637

(22) Filed: Sep. 20, 2024

(65) Prior Publication Data

US 2026/0089132 A1 Mar. 26, 2026

(51) Int. Cl.

*H04L 51/42* (2022.01)
*G06F 9/54* (2006.01)
*H04L 51/046* (2022.01)

(52) U.S. Cl.

CPC .............. *H04L 51/42* (2022.05); *G06F 9/547* (2013.01); *H04L 51/046* (2013.01)

(58) Field of Classification Search

CPC ........ H04L 51/42; H04L 51/046; G06F 9/547
USPC .......................................................... 709/206
See application file for complete search history.

(56) References Cited

U.S. PATENT DOCUMENTS

2006/0080468 A1* 4/2006 Vadlamani .............. G06F 9/546 709/250
2007/0244980 A1 10/2007 Baker, III
2019/0081915 A1 3/2019 Engrav
2022/0321520 A1* 10/2022 Kras ..................... H04L 51/212

OTHER PUBLICATIONS

Microsoft, Specify the administrators and users who can install and manage add-ins for Outlook in Exchange Online, Aug. 30, 2024, https://learn.microsoft.com/en-us/exchange/clients-and-mobile-in-exchange-online/add-ins-for-outlook/specify-who-can-install-and-manage-add-ins (Year: 2024).*
"Build Mail App Extensions", accessed on link https://developer.apple.com/videos/play/wwdc2021/10168/?time=119, 2024, 1 page.

(Continued)

*Primary Examiner* — Zi Ye
(74) *Attorney, Agent, or Firm* — NovoTechIP International PLLC

(57) ABSTRACT

A data processing system implements receiving, via a programmatic interface on a client device, command(s) of an extension that are entered by a user of an email application and configured to execute a function added to the email application, the function being configured to be executed based on one or more triggering criteria; adding the function to the email application by caching the command(s) in settings of an email mailbox of the user at the client device and at an email server, the email server hosting the email application; and in response to detecting occurrence of at least one of the triggering criteria and that the client device has no connectivity to the email server, executing the function based on the command(s) cached in the settings of the email mailbox at the client device.

20 Claims, 10 Drawing Sheets

(56) References Cited

OTHER PUBLICATIONS

"Build your first Outlook add-in", accessed on link https://learn.microsoft.com/en-us/office/dev/add-ins/quickstarts/outlook-quickstart?tabs=visualstudio, May 4, 2024, 8 pages.
"Create Office Add-in projects with Teams Toolkit", accessed on link https://learn.microsoft.com/en-us/office/dev/add-ins/develop/teams-toolkit-overview, May 4, 2024, 3 pages.
"Deploy and publish Office Add-ins", accessed on link https://learn.microsoft.com/en-us/office/dev/add-ins/publish/publish, Jun. 14, 2024, 5 pages.
"Module extension Outlook add-ins", accessed on link https://learn.microsoft.com/en-us/office/dev/add-ins/outlook/extension-module-outlook-add-ins, Apr. 12, 2024, 5 pages.

* cited by examiner

EMAIL SYSTEM DYNAMIC EXTENSION CREATION VIA PROGRAMMATIC INTERFACES

BACKGROUND

Depending on specific needs, many email system extensions have been developed to provide additional functions to the underlying email platforms (e.g., Gmail®, Outlook®). The specific needs can be improving productivity (e.g., spelling and grammar checking) and organization (e.g., setting a to-do list), communication and tracking (e.g., email tracking), security and management (e.g., turning an email application into a customer relationship management (CRM) tool), and the like. One area of particular concern is that the existing extension creation approaches require creating and then saving on a web server a manifest for the extension. Such manifest contains essential information about the extension for the email system to understand the extension's functionalities and provide information about how the system interacts with the extension. The existing extension creation approaches also require a new version of the manifest to be deployed and distributed for any changes made to the extension, which is time and resources consuming. Moreover, the webserver requires a network connection to execute the extension. Thus, there is a need for improved systems and methods of providing email system extensions.

SUMMARY

An example data processing system according to the disclosure includes a processor and a machine-readable medium storing executable instructions. The instructions when executed cause the processor alone or in combination with other processors to perform operations including receiving, via a programmatic interface on a client device, one or more commands of an extension that are entered by a user of an email application and configured to execute a function added to the email application, the function being configured to be executed based on one or more triggering criteria; adding the function to the email application by caching the one or more commands in settings of an email mailbox of the user at the client device and at an email server, wherein the email server hosts the email application; and in response to detecting occurrence of at least one of the triggering criteria and that the client device has no connectivity to the email server, executing the function based on the one or more commands cached in the settings of the email mailbox at the client device.

An example method implemented in a data processing system includes receiving, via a programmatic interface on a client device, one or more commands of an extension that are entered by a user of an email application and configured to execute a function added to the email application, the function being configured to be executed based on one or more triggering criteria; adding the function to the email application by caching the one or more commands in settings of an email mailbox of the user at the client device and at an email server, wherein the email server hosts the email application; and in response to detecting occurrence of at least one of the triggering criteria and that the client device has no connectivity to the email server, executing the function based on the one or more commands cached in the settings of the email mailbox at the client device.

An example non-transitory computer readable medium according to the disclosure on which are stored instructions that, when executed, cause a programmable device to perform functions of receiving, via a programmatic interface on a client device, one or more commands of an extension that are entered by a user of an email application and configured to execute a function added to the email application, the function being configured to be executed based on one or more triggering criteria; adding the function to the email application by caching the one or more commands in settings of an email mailbox of the user at the client device and at an email server, wherein the email server hosts the email application; and in response to detecting occurrence of at least one of the triggering criteria and that the client device has no connectivity to the email server, executing the function based on the one or more commands cached in the settings of the email mailbox at the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
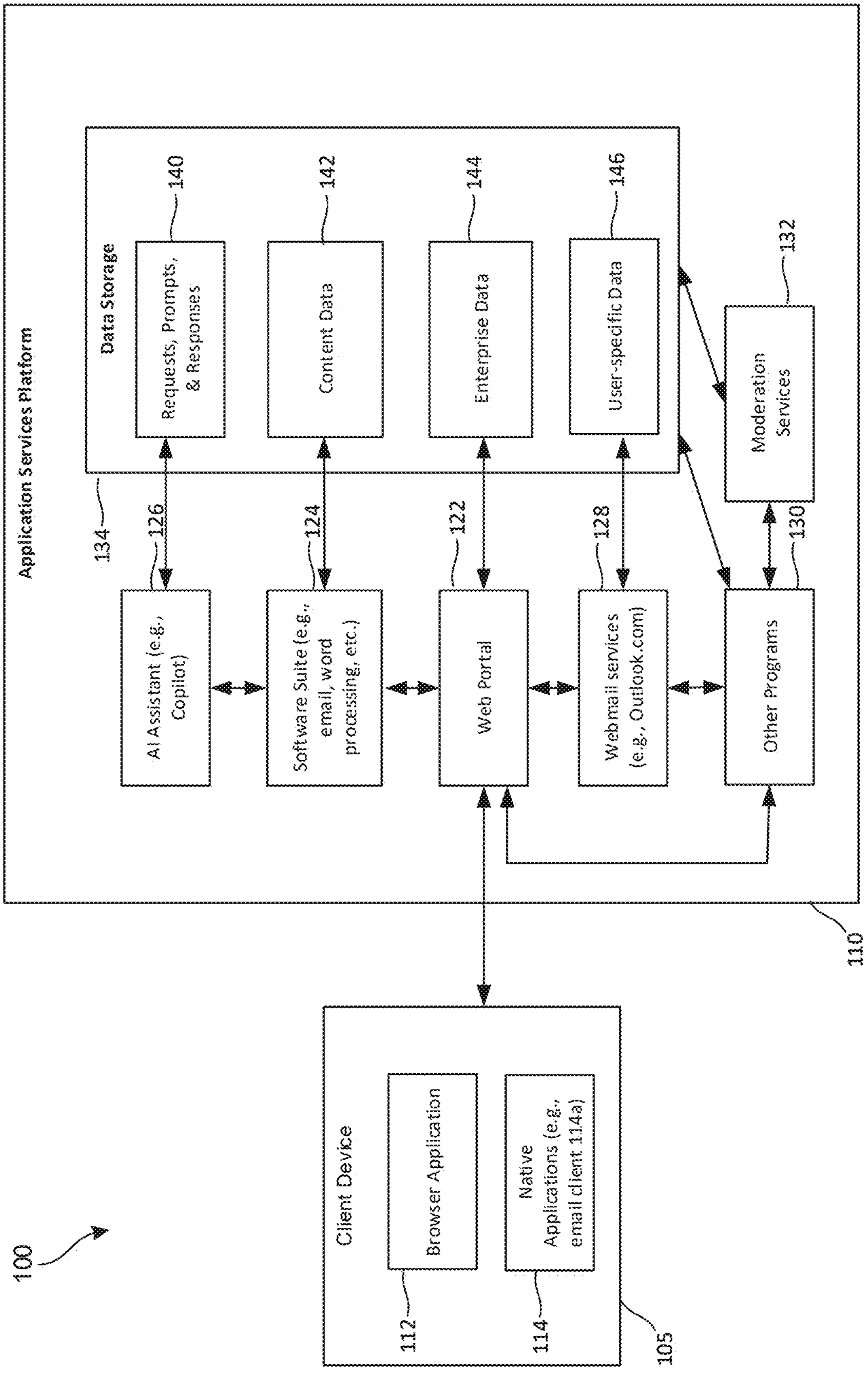
FIG. 1 is a diagram of an example computing environment in which the techniques for providing email system dynamic extension creation via programming interfaces are implemented.

Due to the proliferation and widespread adoption of email systems, it has become increasingly important to add extensions with functionalities that users crave beyond a core set of features of the email systems. In addition, email system extensions allow users to personalize their email experience, such as addressing their unique workflows, boosting productivity, and making email management more efficient. Furthermore, email system extensions can integrate with other tools, and offer a flexible and user-friendly way to boost productivity and streamline email management. However, the existing email system extension creation approaches are restrictive and static. In the current systems, to create an extension, the user needs to create a manifest for the extension, and to write HTML and JavaScript code to be executed by the email system based on the data present in the manifest. If any change needs to be made to the extension, a new version of manifest needs to be deployed and distributed. This makes the extension static, as well as severely restricts who can create an extension because the user needs to host the extension core functionality file(s) in a webserver. Moreover, the webserver requires a network connection to execute the extension.

To address the above-discussed technical problems, a dynamic extension system is proposed to offer the user programmatic access to create email system extensions by entering programmatic dynamic extension commands and then caching/saving the dynamic extension commands (e.g., a snippet) in the user mailbox settings of the email application at the user device as well as at the email server. This approach provides a full security for the dynamic extension commands to be available whenever the email application is used by the user at the user device, whether the user device is online or offline. In addition, the user defines the dynamic extension commands for extension functions without creating a manifest or hosting extension core functionality file(s) in an external webserver. The dynamic extension commands cached/saved to the mailbox of the user as an email setting at the user device can be executed offline (e.g., when there is no connectivity to the email server). The dynamic extension commands saved at the mail server can be executed online (e.g., when there is connectivity to the email server, as well as can be shared with other devices of the user.

In another embodiment, the dynamic extension system supports an email administrator to create a command snippet or a group of commands as an extension and push the extension to one or more user mailboxes as an email setting to be executed without creating a manifest or hosting the extension core functionality file(s) in a separate webserver. In addition, the pushed command snippet to an email application on the client device can be updated dynamically by the email administrator. An aspect of the technical solutions includes creating a group of commands/snippet that can be pushed to the user mailbox as an email setting by an email administrator, and caching/saving the command snippet on the client device so that the command snipped can be executed when there is no network connectivity.

The technical benefits of the dynamic extension system provided herein are to optimize email system extension creation and execution for efficiency, maintainability, and security, across different platforms. In particular, user-defined dynamic extension commands for extension functions are saved/cached as mailbox settings at an email server as well as at the user device to be switched between online and offline extension commands based on a client device connectivity status, and to be executed without creating a manifest or hosting extension core functionality file(s) in an external webserver. As a result, the dynamic extension commands are fast and easy to develop, deploy, maintain, and update.

Another technical benefit of the dynamic extension system is to share the dynamic extension commands saved as the mailbox settings at the email server with all of the user's devices across Windows, Mac, mobile, and other platforms.

Another technical benefit of the dynamic extension system is to run by a secure platform in its own sandbox, so that the application programming interface (API) exposed is limited to its commitments, thereby preventing accessing other critical resources, making unauthorized changes, or installing malware.

Another technical benefit of the dynamic extension system is to support users without programmatic knowledge, by offering an artificial intelligence (AI) assistant to assist the users to write the dynamic extension commands.

Another technical benefit of the dynamic extension system is to support email administrators to send dynamic extension commands to the email server as email policies, as well as to user device(s) for offline use, which unlocks compliance scenarios not possible in the existing email extension systems.

These features among the overall process details described below in the disclosure provide a novel solution from both a technical and functional standpoint. These and other technical benefits of the techniques disclosed herein will be evident from the discussion of the example implementations that follow.

The term "programmatic interface" refers to a specific type of API used to interact with a system or software programmatically. It provides a procedural API for performing various tasks, such as system administration, querying and manipulating data, and accessing specific features of a system. The programmatic interface provides a way for developers to automate tasks, integrate systems, and access specific functionalities programmatically.

The term "programming interface", in a broader sense, refers to the set of tools, libraries, and documentation provided by a software or system to help developers write code and interact with it. It provides developers with a well-defined way to use and interact with the software or system, allowing them to leverage its capabilities in their own applications. In the content of this disclosure, the term "programming interface" can be used interchangeably with the term "programming interface."

The term "extension" refers to a small piece of software that adds specific features or functionalities to an existing program (e.g., an email application), such as a grammar checker, a translator, and the like. An extension is usually installed within the main program itself, often through built-in app stores or settings menus. An extension is often lightweight and less resource-intensive in comparison with a main program, and provides limited functionality.

The term "command" refers to a single line of code that instructs a program engine to perform an action (e.g., variable declaration, assignment, or basic control flow). A command snippet is a group of commands bundled together that perform a specific task (e.g., a complex task involving multiple statements, defining functions, or handling events).

Although various embodiments are described with respect to Outlook®, it is contemplated that the approach described herein may be used with any email application/platform.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to email applications, presentation applications, website authoring applications, collaboration platforms, communications platforms, and/or other types of applications in which users may create, view, and/or modify content. In the implementation shown in FIG. 1, the application services platform 110 supports users to create email system extensions via programming interfaces, according to the techniques described herein. In one embodiment, the client device 105 and the application services platform 110 communicate with each other over a network (not shown) to implement the dynamic extension system. In another embodiment, the application services platform 110 is independently implemented on the client device 105. The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The computing devices may include virtually any type of general- or specific-purpose computing devices with data processing units. For example, a computing device may be a user device such as a desktop computer, a laptop computer, a tablet computer, a display device, a camera, a printer, or a smartphone. Likewise, a computing device may also be a server device such as an application server computer, a virtual computing host computer, or a file server computer. Likewise, the computing device may be an example of any of the devices, a device within any of the distributed systems, illustrated in or referred to in any of the following figures, as discussed in greater detail below.

The client device 105 includes a native application 114 and a browser application 112. The native application 114 is a web-enabled native application, in some implementations, which enables users to create, view, and/or modify email system extensions via programming interfaces. The web-enabled native application utilizes services provided by the application services platform 110 including but not limited to creating, viewing, and/or modifying email system extensions via programming interfaces. The native application 114 implements a user interface 305 shown in FIGS. 3A-3D in some implementations. In other implementations, the browser application 112 is used for accessing and viewing web-based content provided by the application services platform 110. In such implementations, the application services platform 110 implements one or more web applications, such as the browser application 112, that enables users to view, create, and/or modify email system extensions via programming interfaces. The browser application 112 implements the user interface 305 shown in FIGS. 3A-3D in some implementations. The application services platform 110 supports both the native application 114 and the browser application 112 in some implementations, and the users may choose which approach best suits their needs.

In one embodiment, the application services platform 110 includes email servers interacting with an email client **114*a* on the client device 105, using a protocol called SMTP (Simple Mail Transfer Protocol) for sending emails and IMAP (Internet Message Access Protocol) or POP3 (Post Office Protocol 3) for receiving emails. For example, to send emails, the user composes a new email in the email client 114*a*, adding recipient addresses, subject line, and message body. The email client 114*a* establishes a secure connection with the email server using SMTP, authenticates the server using the user's email address and password (or a security token), and transmits the email data to the email server. The server verifies the recipient addresses, checks for spam or malware, queues the email for delivery, and attempts to deliver the email to the recipient's email server using SMTP. When the recipient has an account on the same email server, the email will be delivered internally. When the recipient uses an external email provider, the email server will connect to that provider's server for final delivery. Optionally, the email client 114*a*** may receive a notification from the email server indicating success or failure of delivery.

To receive emails, the email client **114*a* establishes a connection with the email server using, for example, IMAP, authenticates with the server using email credentials, and retrieves a list of folders and emails in the user's mailbox on the email server. IMAP allows the user to keep copies of emails on the server and access them from multiple devices. Optionally, the user can choose to download the entire email or just the headers (sender, subject, etc.) depending on the user's settings and internet connection. Downloaded emails are displayed in the email client 114*a*** for the user to read and manage.

In another embodiment, the application services platform 110 includes a web portal 122 (e.g., Microsoft 365® app launcher), a software suite 124 (e.g., Microsoft 365®), an AI assistant 126 (e.g., Copilot®), a webmail services 128 (e.g., Outlook.com®), and other programs 130. In other embodiments, the application services platform 110 also includes moderation services 132 and a data storage 134.

The web portal 122 is configured to receive requests from the native application 114 and/or the browser application 112 of the client device 105. The web portal 122 can check enterprise data 144 (including enterprise employee data) or user-specific data 146 for the user credentials before grating access to the application services platform 110. The requests may include but are not limited to requests to create, view, and/or modify content of interest (e.g., emails, letters, resumes, summaries, translation, reports, poems, articles, stories, blog posts, movie scripts, image, music, video in various styles, video games, code snippets, and the like), and/or sending prompts to the AI assistant 126 to generate dynamic extensions. The web portal 122 also coordinates communication and exchange of data among components of the application services platform 110 as discussed in the examples which follow. Having the single web portal 122 simplifies access to all the software suite applications. A user can log in once and easily switch between different programs of the software suite 124 like Outlook®, OneDrive®, Word®, Excel®, PowerPoint®, OneNote®, SharePoint®, Teams®, Viva Engage®, and more, to interact with content data 142 in the data storage 134 of the application services platform 110. The web portal 122 provides a consistent user interface for all services of the application services platform 110. This makes it easier to navigate and find the tools a user need, regardless of the specific program. A user can manage the user's account settings, profile, and subscriptions from a single location within the web portal 122. The web portal 122 acts as your one-stop shop for accessing, managing, and using all the programs, although the programs probably do not share the same physical server or necessarily reside in the same cloud region. The application services platform 110 utilizes a distributed cloud infrastructure, meaning different services may be hosted in different physical locations or regions. For example, user emails might be hosted in a different physical location than the user's documents. This distributed approach allows the application services platform 110 to scale each service independently based on demand. It also offers redundancy, so if there is an issue in one location, other locations can handle the workload. If there is an outage in one location, other locations can keep services running.

Figure 2:
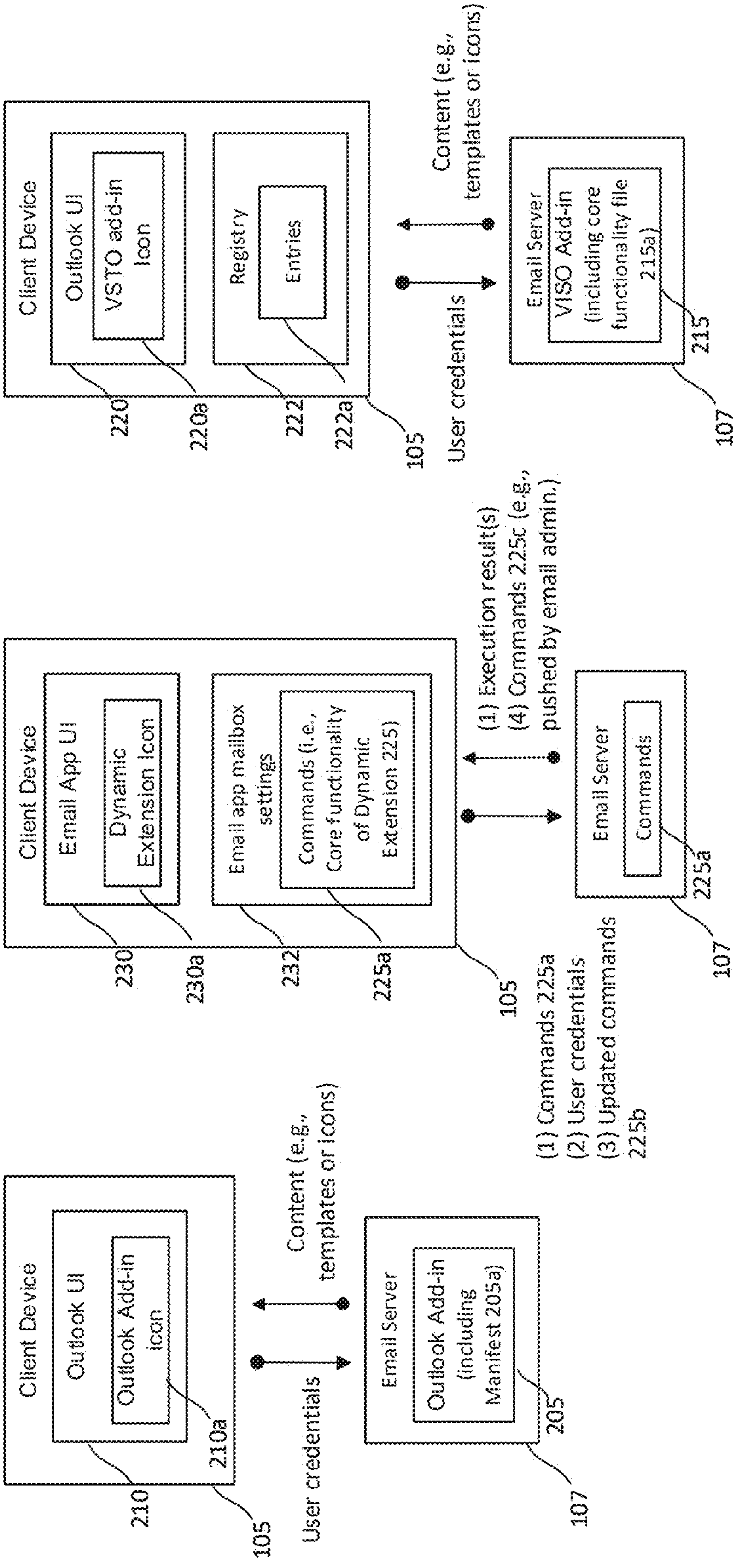
FIG. 2 is a conceptual diagram of the email system dynamic extension creation via programming interfaces of the system of FIG. 1.

FIG. 2 includes conceptual diagrams of the email system dynamic extension creation of the dynamic extension system of FIG. 1 side-by-side with two existing email system extension creation processes. As shown in the following two scenarios, webmail extensions (e.g., Outlook add-ins) and device-installed email application extensions (e.g., VSTO add-ins) require an email server to store the core functionality files of the add-ins (i.e., extensions) and the client devices store only light-weighted local configuration data, unlike the email system dynamic extension that caches/saves the same commands at the client device 105 and the email server 107, without requiring email server 107 to host a manifest or extension core functionality file(s).

As mentioned, to create an extension in an existing email system, a user needs to create a manifest for the extension, and write HTML and JavaScript code to be executed by the email system based on the data present in the manifest. On the left-hand side of FIG. 2, an Outlook add-in 205 (including a manifest 205*a*) are physically stored on an email server 107 of the user (e.g., an add-in developer), but not on the client device 105. The manifest 205*a* has a pointer to the HTML and JavaScript on the email server 107 (e.g., a webserver).

The Outlook add-in 205 (including manifest 205*a*) is accessed by the email client 114*a* (e.g., an Outlook client or a web browser) through the internet and shown in an Outlook UI 210 as an Outlook add-in icon 210*a* that can be selected by a user to execute the Outlook add-in 205. The Outlook client or the web browser loads the manifest 205*a*, understands the manifest 205*a*, and calls the corresponding add-in (e.g., the Outlook add-in 205).

There are two aspects to consider regarding information related to add-ins on the client device 105. When the user installs an add-in, some configuration information might be stored locally on the client device 105. This could include things like the user's login credentials for the add-in (if required), settings the user customized within the add-in, or a small amount of cached data to improve performance. This local storage location depends on the type of Outlook client the user is using. For Outlook® desktop, the specific location can vary depending on the version of Outlook®, but it is typically within the user profile folder. For webmail app (e.g., Outlook.com®), configuration information for web add-ins is likely stored within the browser's storage mechanisms (cookies or local storage).

When the Outlook add-in 205 provides downloadable content (e.g., templates or icons), those files might be stored locally on the client device 105 in a designated folder. This folder location again depends on the Outlook® version and the add-in itself. While some configuration or downloaded content might be stored locally, the core functionality of the add-in itself remains on the developer's server 107. The user can manage the user's add-ins and see the add-ins' configuration details within the Outlook® settings section. Overall, Outlook add-ins 205 are cloud-based, but some related configuration data or downloaded content might reside on the client device 105 depending on the add-in and the email client 114*a*.

Developing the Outlook add-in 205 requires some technical expertise. There are two main types of Outlook add-ins: (1) content Add-ins that modify the content or layout of emails, and typically run in the task pane of the email client 114*a*. (2) mail Apps that can interact with emails in various ways, like sending automated responses, scheduling meetings, or integrating with other services. Microsoft offers various tools for building Outlook add-ins, with Visual Studio being the most popular choice. Visual Studio provides templates and tools specifically designed for creating Office Add-ins.

A developer needs to plan what the add-in will do and how it will interact with Outlook, and sketches out the user interface (UI) elements for the add-in, considering how users will interact with it within the email client 114*a*. The developer then uses a chosen development environment and specific technologies (e.g., HTML, JavaScript, or web APIs) to write the code for the add-in, implements security considerations, tests and debugs the add-in, and optionally packages and publishes the add-in (e.g., on the Microsoft AppSource® platform).

VSTO (Visual Studio Tools for Office®) allows a user to develop add-ins that extend the functionality of Microsoft Office applications, including Outlook. COM VSTO add-in is a more descriptive way of referring to a VSTO add-in. COM (Component Object Model) is the underlying technology that VSTO add-ins use to communicate with Office applications. "COM VSTO add-in" clarifies that the add-in leverages COM for interaction. The process for creating a VSTO add-in for Outlook is similar to the process for creating an Outlook add-in as discussed. A developer can create a VSTO add-in 215 and then install the VSTO add-in 215. Once the VSTO add-in 215 is installed, the VSTO add-in 215 is listening to any of trigging events or any objects of interest exposed by Outlook and behave accordingly. The VSTO add-in system creates an object model exposed to Outlook using an older unsecured interface. One difference is the Outlook add-in 205 is a web-based add-in, such that the manifest 205*a* can be shared by all devices of the same user, such as PC, Mac, mobile devices, and the like, while VSTO add-in 215 works only on the installed device with, for example, win 32 Outlook. Another difference is that the Outlook add-in 205 is a secure platform running in its own sandbox, so that the API exposed is limited to its commitments.

On the right-hand side of FIG. 2, VSTO add-ins are stored in two main locations: on the email server 107 (for deployment) and on a target machine (e.g., the client device 105 storing local configuration for each user). When the VSTO add-in 215 is deployed to be used by one or more users, its core functionality file(s) 215*a* are typically installed on the email server 107. The VSTO add-in 215 (including the core functionality file(s) 215*a*) is accessed by the email client 114*a* (e.g., Outlook client) through the internet and shown in an Outlook UI 220 as a VSTO add-in icon 220*a* that can be selected by a user to execute the VSTO add-in 215.

The specific location to store the VSTO add-in 215 on the email server 107 depends on its deployment configuration, e.g., within a designated folder structure for the email applications on the email server 107. Even when deployed on the email server 107, the target machine will store some configuration information related to the VSTO add-in 215. This local storage helps the add-in function properly within the email client 114*a*. The location of this local configuration data in the target machine depends on the operating system and the version of Outlook being used. Taking Windows as an example, a registry 222 plays a key role in storing configuration details for the VSTO add-in 215. The registry entries 222*a* typically reside under HKEY_CURRENT_USER or HKEY_LOCAL_MACHINE depending on whether the VSTO add-in 215 is installed for the current user only or for all users on the target machine.

In short, the email server 107 stores the main/core VSTO add-in assembly file(s) (e.g., DLLs or executables) containing the add-in's code, and any additional resources the VSTO add-in 215 needs to function (e.g., images, icons, etc.). In terms of local configuration, the target machine stores registry entries pointing to the location of the add-in files on the email server 107, user-specific settings or preferences for the VSTO add-in 215 (if applicable), potentially some cached data to improve performance.

A user does not directly copy the VSTO add-in files to the target machine when deploying. Instead, a VSTO add-in installer registers itself and points to the server location where the core files reside. The local configuration data stored at the target machine is typically small compared to the main/core add-in files on the email server 107.

According to the dynamic extension system shown in the middle of FIG. 2, the email client 114*a* sends different content to the email server 107 during (1) a development stage, (2) a deployment stage, and (3) an update stage. During the development stage, the user develops dynamic extension commands 225*a* (i.e., for one or more core functionalities, e.g., Table 1) of a dynamic extension 225 using JavaScript, HTML5, CSS3, XML, and the like. Taking JavaScript as an example, there are several tools for the user to write JavaScript, such as a text editor (e.g., Notepad®, TextEdit®, Sublime Text®, or Atom®), a code editor (e.g., Visual Studio®, Brackets®, etc.), an integrated development environment (IDE, e.g., WebStorm®, Visual Studio®, Eclipse®, etc.), an online IDE (e.g., JSFiddle®, CodePen®, or Replit®), and the like.

The user and/or a processor of the client device 105 then validates the dynamic extension commands 225*a*. Validating command snippets involves ensuring they function as intended and do not lead to unexpected errors. Mechanisms for validating command snippets include manual testing, shell scripting, static code analysis tools, unit testing frameworks, and the like. For instance, to validate JavaScript code is to check the code for errors and potential issues without actually running the code. On the other hand, the compile JavaScript code is to transforms the JavaScript code into a different format, typically machine code or bytecode, that can be directly executed by a computer or a virtual machine.

The processor then saves a copy of the dynamic extension commands 225*a* locally and another copy at the email server 107 in the user's email application mailbox settings 232. The storage limit of mailbox settings can be around 32 KB in an example. Once the dynamic extension commands 225*a* are stored in the mailbox settings, they are within Outlook to be automatically carried over to a different email platform of the same user, such as a web email platform, a Mac email platform, a mobile email platform, and the like.

Mailbox settings can be found on the email server 107, an email provider's web interface or within the email client software at the client device 105. The specific options vary slightly, but some common features include account Information (e.g., username, primary email address, and any additional email aliases, storage and usage (e.g., that the mailbox is using and set storage limits), sending and receiving (e.g., related to message size restrictions for incoming and outgoing emails), forwarding (e.g., enable or disable email forwarding, or choosing to send a copy of all your emails to another address), auto-responders (e.g., to go out to anyone who emails the user while the user is away), display settings (e.g., what information appears in the message list preview), security (e.g., change password, enable two-factor authentication, and spam filtering settings), and the like. Similar to creating rules for receiving an incoming message, the dynamic extension system adds dynamic extension commands into mailbox settings. Mailbox rules are text-based (written in plain English) and a part of personal mailbox settings allowing the user to sort, filter, or move emails automatically based on criteria the user defines. However, rules are a pre-defined set that can be executed only on certain events, like when an email is received, or when an email is sent. Parameters that can be manipulated on an email item during rule execution are limited to some pre-defined rudimentary actions, while the dynamic extension has no such limitations as the rules.

The dynamic extension commands 225*a* is in syntax supported by a programmatic interface of the email system, and cached/saved in the mailbox as settings. For example, Outlook supports JavaScript, and the commands will be regular JavaScript and can also use the programmatic interfaces exposed by Outlook JavaScript library. There are many use scenarios for creating dynamic extensions based on JavaScript, and the creativity is only limited by the JavaScript library or Outlook JavaScript library. However, the dynamic extension commands 225*a* are not compiled as a part of a JavaScript library like the VSTO add-in code.

The Outlook JavaScript library is very powerful and exposes several events and interfaces. By using this library, the dynamic extension system allows users to define command groups (or snippets) without having to have an overhead of creating a manifest, or hosting code in an external webserver. The dynamic extension 225 can be accessed by the email client 114*a* (e.g., Outlook client) through the internet and shown in an Outlook UI 230 as a Dynamic Extension icon 230*a* that can be selected by a user to execute the dynamic extension 225.

TABLE 1

```
When(Events.EmailSend)
{
if (email.body.Text.Contains("some blocked word")
{
Email.SendFailure( );
}
}
```

During the deployment stage, the email client 114*a* sends the user's credentials to access the email server 107 for email services. The dynamic extension 225 can be executed at the email client 114*a* and/or the email server 107 based on their respective copy of the dynamic extension commands 225*a* to block unwanted word(s). Since the email client 114*a* can execute independently, the dynamic extension 225 can be executed even when the email client 114*a* is offline. Another advantage of this system is that the settings will be cached on the email client 114*a*, and even when there is no network connectivity, these snippets can be executed. This approach provides a full security for the dynamic extension commands to be available whenever the email application is used by the user at the user device, whether the user device is online or offline. In particular, user-defined dynamic extension commands for extension functions are saved/cached as mailbox settings at an email server as well as at the user device, to be switched between online and offline extension commands based on a client device connectivity status, and to be executed without creating a manifest or hosting extension core functionality file(s) in an external webserver. This is particularly useful if the snippet is used for compliance reasons. This is impossible for Outlook add-ins or VSTO add-ins, since they rely on the manifest 205*a* or the core functionality file(s) 215*a* stored on the email server 107 to execute the add-ins.

During the update stage, the email client 114*a* modifies the dynamic extension commands 225*a* (e.g., changing the blocked word), caches/saves the updated dynamic extension commands 225*b* locally, and sends the updated dynamic extension commands 225*b* to the email server 107. As such, the dynamic extension 225 is dynamically updated without the overhead of the manifest 205*a* or the core functionality file(s) 215*a* stored on the email server 107.

The email server 107 sends different content to the email client 114*a* during (1) the deployment stage, and (4) a push stage. Taking commands in Table 2 as another example, during the deployment stage, the email server 107 sends execution results of the dynamic extension 225 to the email client 114*a*. During the update stage, the email server 107 receives new dynamic extension commands 225*c* (e.g., in Table 2) created by an email administrator, and sends the new commands 225*c* to be cached/saved at the email client 114*a* for execution. As such, email administrators can create snippets and push them to the user mailbox as an email setting. The dynamic extension system will execute the commands. This shares similar advantages such as no need to host the extension core functionality file(s) in a separate web server.

TABLE 2

```
When(Event.RecepientChanged)
{
If (recepientIsExternal( ))
{
InsertExternalEmailSignature( )
}
else
{
InsertInternalEmailSignature( );
}
}
```

Email administrators have access to the email server 107 through specialized administrative tools or web interfaces designed for administration purposes. This interface provides a broader view and more powerful tools for managing the email server 107, user accounts, and email policies. Mailbox policies are set for handling emails of all users, such as security measures, message encryption, and retention policies for emails. Email administrators may perform some limited tasks remotely on user mailboxes through the web interface, depending on the specific email system. These tasks may include: resetting passwords, mailbox management (e.g., managing mailbox settings like quotas or enable/disable features). In this scenario, the copy of the dynamic extension commands 225*a* as an extension are saved first at a personal or group mailbox in the email server 107 in an email policy, and then pushed to cache/save at the mailbox at the client device 105. In particular, when the email administrator enters/sends the dynamic extension commands 225*a* to the email server 107 as a policy, the dynamic extension system can read that particular policy and create the dynamic extension 225. Once the email administrator sends the policy to email platform, the policy goes through all of the email platforms for all users and their devices. This means that the dynamic extension system takes the dynamic extension commands 225*a* and moves them to the user's mailbox stored at the email server 107. Concurrently or subsequently, the dynamic extension system pushes the dynamic extension commands 225*a* as an extension to be cached/saved at the mailbox at the client device 105 (like rules).

On the client device 105, the email administrator does not have to worry about sending a manifest, posting an add-in, and executing JavaScript. Instead, the email administrator just sends the dynamic extension commands 225*a* to the email server 107, and the dynamic extension system will take the dynamic extension commands 225*a* and executes the dynamic extension commands 225*a* in a secure way in a sandbox.

In summary, the dynamic extension system operates differently from the Outlook add-in system and the VSTO add-in system during (1) the development stage, (2) the deployment stage, (3) the update stage, and (4) the push stage. During the development stage, the dynamic extension commands 225*a* are cached/saved first at the client device 105, and then the email server 107, while the manifest 205*a* of the Outlook add-in 205 and the core functionality file(s) 215*a* of the VSTO add-in 215 are saved only at the email server 107.

During the deployment stage, the dynamic extension 225 does not need to be installed, and no downloading of the dynamic extension commands 225*a* is required, since the dynamic extension commands 225*a* is cached/saved in the mailbox settings of the client device 105 during the development stage. In contrast, the Outlook add-in system and the VSTO add-in system need to download content (e.g., templates or icons) to the client device 105 in a designated folder. In addition, the dynamic extension 225 is executed jointly or independently at the client device 105 or the email server 107 depending on the function of the dynamic extension 225, while the Outlook add-in 205 and the VSTO add-in 215 must be executed in conjunction with the email server 107 (not independently at the client device 105). As such, the dynamic extension 225 can be executed at the client device 105 offline, while the Outlook add-in 205 and the VSTO add-in 215 cannot be executed at the client device 105 offline.

During the update stage, a user can easily change/update the dynamic extension commands 225*a* and cache/save the changed/updated dynamic extension commands 225*a* in the user's mailbox settings at the client device 105 and at the email server 107. On the other hand, any changes to the manifest 205*a* of the Outlook add-in 205 and the core functionality file(s) 215*a* of the VSTO add-in 215 are saved only at the email server 107.

During the push stage, an email administrator can create new dynamic extension commands 225*c* and push the new dynamic extension commands 225*c* as an extension to be cached/saved in one or more user mailbox settings at client device(s) 105. On the other hand, any new manifest 205*a* of the Outlook add-in 205 and new core functionality file(s) 215*a* of the VSTO add-in 215 are saved only at the email server 107.

Based on programmatic possibilities of the dynamic extension 225 at the client device 105, and the dynamic extension 225 can run even without hosting the extension in a web server. Users with programmatic knowledge can extend the functionalities of the email system using the dynamic extension 225 without complex setup. For users without programmatic knowledge, the dynamic extension system offers the AI assistant 126 to assist the users to send a request to the AI assistant 126 to write the dynamic extension commands 225*a* based on user prompts and generate responses. Such requests, prompts and responses 140 can be saved in the data storage 134. Email administrators can send dynamic extension commands to one or more client devices to be executed online or offline, which is not possible for an Outlook add-in or VSTO add-in.

Although various embodiments are described with respect to email system dynamic extension creation, it is contemplated that the approach described herein may be used with other applications, such as word processing applications (e.g., Word®), presentation application (e.g., PowerPoint®), etc. For instance, Office® JavaScript is a common library shared by many applications each of which gets its own way of storing items in the cloud as opposed to on the user devices. Since every application behaves differently, the respectively dynamic extension commands 225*a* can be stored at a storage keeping all user settings (e.g., a user data partition/shard, a user profile storage, and the like) based on that particular application, depending on particular application implementations, without creating a manifest or hosting extension core functionality file(s) in an external webserver. Each user data partition/shard acts as a separate database, holding user-specific data (including user ID, user settings, dynamic extension commands 225*a*, and the like). An application determines which partition/shard holds the user setting data a dynamic extension needs for execution accordingly.

In short, an existing webmail system (e.g., Outlook.com®, Gmail®, and the like) does not directly download user mailbox settings to a user device. Instead, it relies on a client-server model to manage them. User mailbox settings, including folder organization, view preferences, and email rules the user created on the web interface, are all stored on web servers. When the user access the webmail system through a web browser or a webmail mobile app, the web browser or the webmail mobile app communicates with the web server to retrieve the user settings saved on the web server. This ensures a consistent experience across different devices of the user. The specific details of how these user settings are stored on the web server involve complex data structures and configuration files. The webmail provider manages them centrally. The web browser or the webmail mobile app acts as a user interface, allowing the user to view, modify, and create the user settings. These changes are then saved back to the web server. While the client device 105 might cache some temporary data related to how the user's mailbox is displayed, this does not involve the actual settings themselves. This cached data helps with faster loading times but is temporary. In contrast, in addition to saving the dynamic extension commands 225*a* in the user mailbox as settings at the email server 107, the dynamic extension system also caches/saves a copy of the dynamic extension commands 225*a* at the client device 105 since the dynamic extension commands 225*a* was developed by the user at the client device 105, and caches/saves the dynamic extension commands 225*a* at the client device 105 for the deployment stage, the update stage, and the push stage.

The existing email systems installed in the client device 105 (e.g., Outlook for Windows®) take a different approach to saving user mailbox settings compared to the existing webmail systems. Unlike the webmail systems, a device-installed email system stores most user mailbox settings directly on the client device 105. This allows for functionalities like offline access, and faster performance. Example types of settings stored locally include account settings (e.g., user email address, server details, and password), view preferences (e.g., folder layout, sorting criteria, and column configurations), user-created rules (e.g., rules to automate actions like sorting or flagging emails). These settings are typically stored in the registry 222 as a part of the registry entries 222*a* or specific file(s) on the client device 105. The exact location can vary depending on the email application version and the operating system of the client device 105. Generally, they reside in hidden folders within the user profile directory. If the user wants to use the same settings on another device, the user needs to export and import the settings manually. A relatively recent feature in Outlook desktop allows a user to opt-in to store some mailbox settings in the cloud. However, this cloud storage feature is optional and not a default behavior. In contrast, in addition to caching/saving the dynamic extension commands 225*a* in the user mailbox as settings at the client device 105, the dynamic extension system also permanently saves a copy of the dynamic extension commands 225*a* at the email server 107 by default since the dynamic extension commands 225*a* was developed by the user at the client device 105.

In one embodiment, the AI assistant 126 includes generative models trained to generate content (e.g., textual, spreadsheet, chart, report, audio, image, video, and the like) in response to prompts input by a user via the native application 114 or via the browser application 112. For instance, the AI assistant 126 uses generative models including a large language model (LLM) in some implementations. Examples of such models include but are not limited to a Generative Pre-trained Transformer 3 (GPT-3), GPT-4 model. For instance, the generative models are implemented using a multimodal model (e.g., GPT-40) in some implementations. Developing an AI model capable of generating content of interest requires training on large and diverse datasets, thereby ensuring that the generated content are relevant and accurately reflect the content of interest. Other implementations may utilize machine learning models or other generative models to generate dynamic extensions according to contextual features of the content and/or preferences of a user.

The dynamic extension system stores the dynamic extension commands 225*a* in a user mailbox with full security (e.g., in a sandbox) so that they can be available whenever the email system is used by the user. A sandbox is used to enhance computer security by providing a restricted environment to run important or potentially risky programs or code. By running the dynamic extension commands 225*a* in a sandbox, the dynamic extension system limits their access to critical resources and prevents them from making unauthorized changes or installing malware.

For users without programmatic knowledge, the AI assistant 126 can construct a prompt based on the user inputs, and outputs the prompt to a language model to write dynamic extension commands for the user. In some implementations, the AI assistant 126 may submit further prompts to regenerate dynamic extensions(s) based on user feedback. The AI assistant 126 can cache some of the user-specific data 146 (e.g., user preferences, user activities, and the like) for the duration of the user session in which the user uses the native application 114 or the browser application 112. A technical benefit of this approach is that the user-specific data 146 does not need to be retrieved each time that the user submits a natural language prompt to generate dynamic extensions. The web portal 122 maintains user session information in a persistent memory of the application services platform 110 and retrieves the user-specific data 146 from the user session information in response to each subsequent prompt submitted by the user. The web portal 122 then provides the newly received user prompt and the user-specific data 146 to the AI assistant 126 to construct the prompt as discussed in the preceding examples.

All the above-discussed requests, prompts and responses 140, the content data 142, the enterprise data 144, and the user-specific data 146 (e.g., user ID, user preferences, user activities, user settings, dynamic extension commands 225*a*, and the like), can be stored in the data storage 134. The data storage 134 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCI), network virtualization and software-defined networking (SDN), container storage, and the like.

FIGS. 3A-3D are example user interfaces of the email system dynamic extension creation via programming interfaces that implements the techniques described herein. The example user interface shown in FIGS. 3A-3D is a user interface of an email application, such as but not limited to Microsoft Outlook®. However, the techniques herein for dynamic extension creation via programming interfaces are not limited to use in the email application and may be used to generate dynamic extensions for other types of applications including but not limited to presentation applications, website authoring applications, collaboration platforms, communications platforms, and/or other types of applications in which users create, view, and/or modify dynamic extensions. Such applications can be a stand-alone application, or a plug-in of any application on the client device 105, such as the browser application 112, the native application 114, and the like. For example, the dynamic extension system can work on the web or within a virtual meeting and collaboration application (e.g., MICROSOFT TEAMS®) or an email application (e.g., OUTLOOK®). The dynamic extension system can be integrated into the MICROSOFT VIVA® platform or could work within a browser (e.g., WINDOWS® EDGE®), or MICROSOFT COPILOT®. The dynamic extension system can also work within a website chat functionality (e.g., the BING® chat functionality).

Figure 3A:
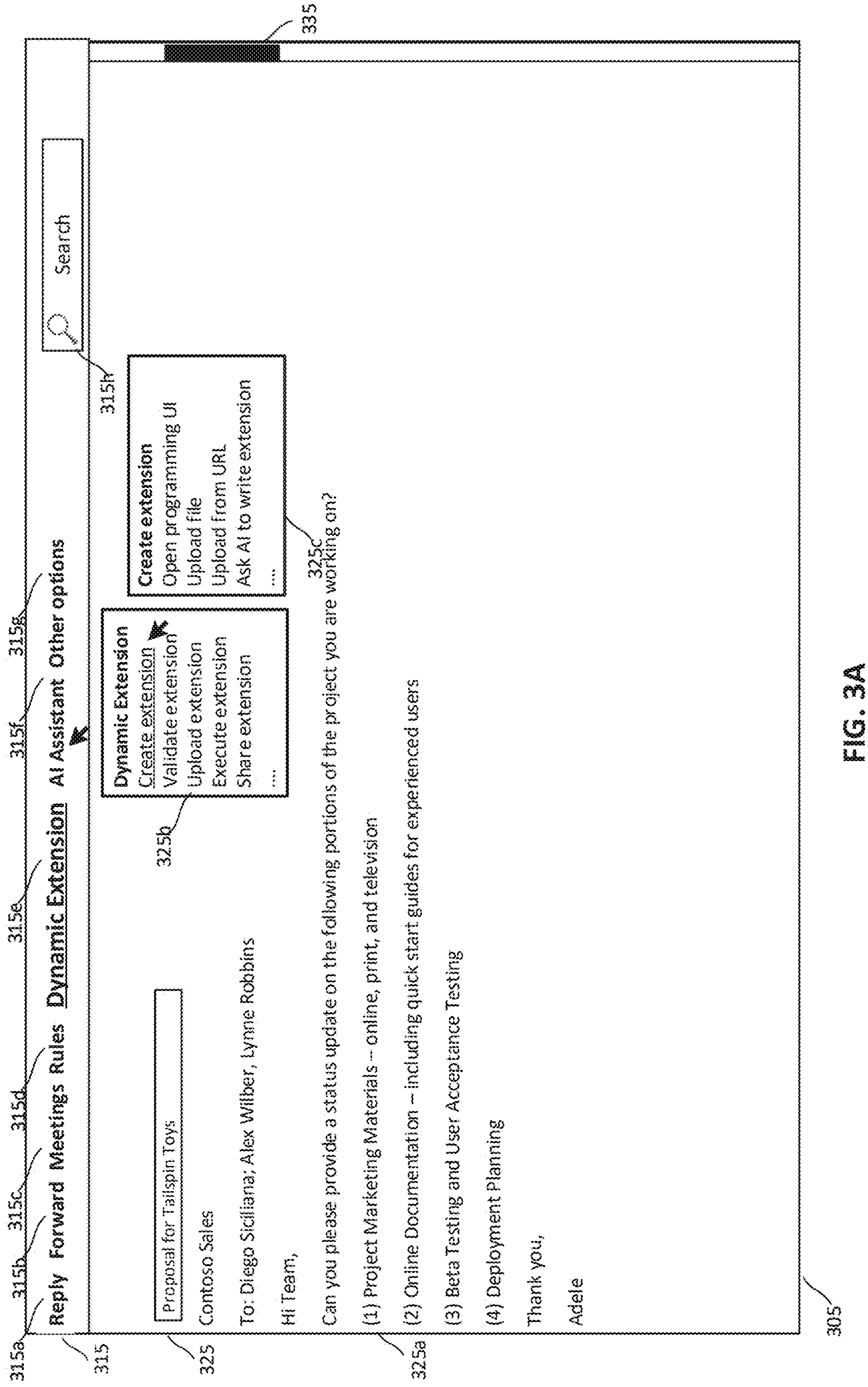
FIGS. 3A-3D are example user interfaces of the email system dynamic extension creation via programming interfaces that implement the techniques described herein.

FIG. 3A shows an example of the user interface 305 of an email application in which the user is interacting with a programmatic interface to generate dynamic extensions. The user interface 305 includes a control pane 315, a content pane 325 and a scrollbar 335. The user interface 305 may be implemented by the native application 114 and/or the browser application 112.

In some implementations, the control pane 315 includes a Reply button 315*a*, a Forward button 315*b*, a Meetings button 315*c*, a Rules button 315*d*, a Dynamic Extension button 315*e*, an AI-Assistant button 315*f*, an Other options button 315*g*, and a search field 315*h*.

In FIG. 3A, the content pane 325 shows an email 325*a*. Upon a user selection of Dynamic Extension button 315*e*, the content pane 325 shows a Dynamic Extension dropdown menu 325*b* with options of Create extension, Validate extension, Upload extension, Execute extension, Share extension, and the like. Upon a user selection of the option of Create extension, the content pane 325 shows a Create extension dropdown menu 325*c* with options of Open programming UI, Upload file, Upload from URL, Ask AI to write extension, and the like.

Figure 3B:
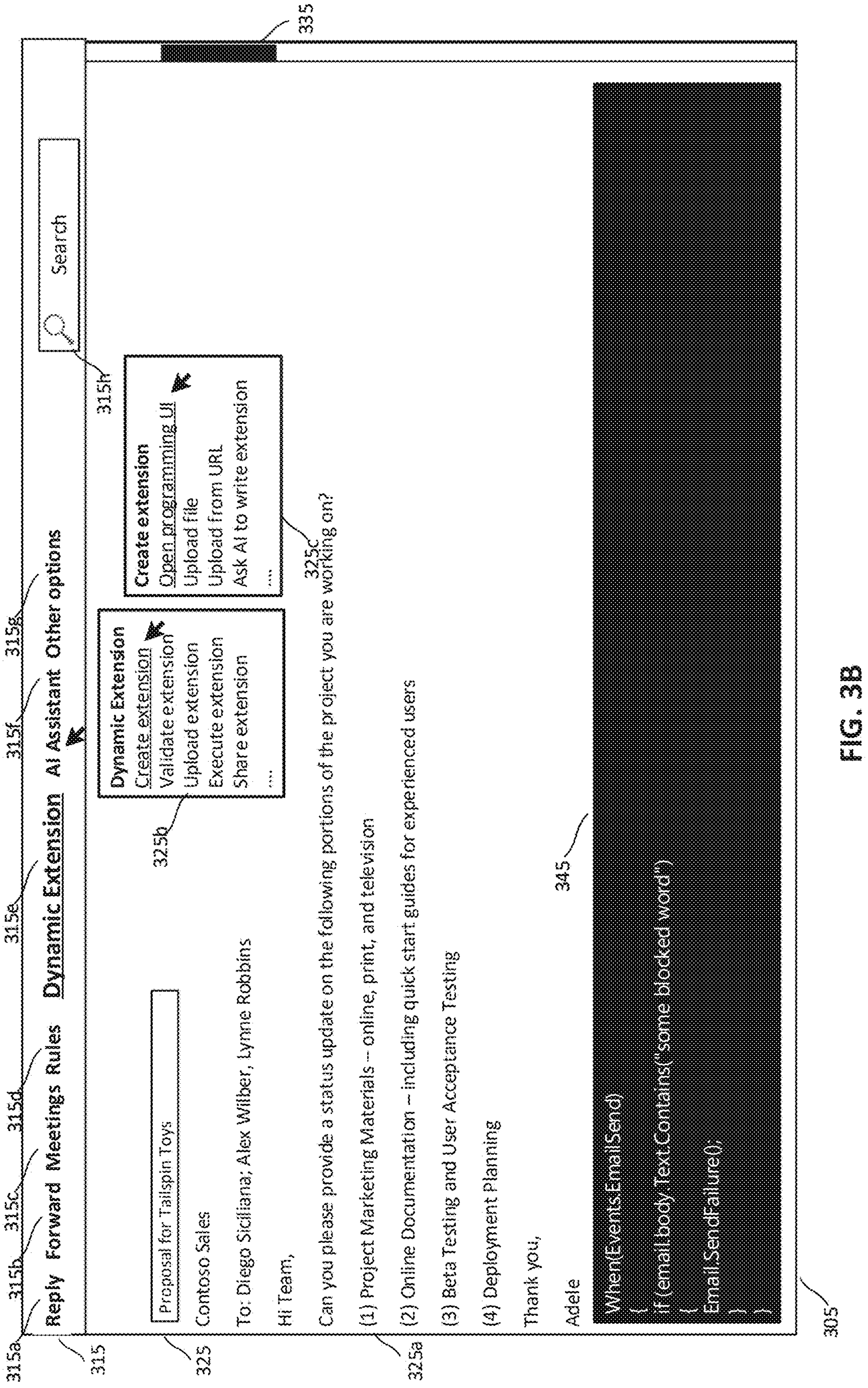
Figure 3C:
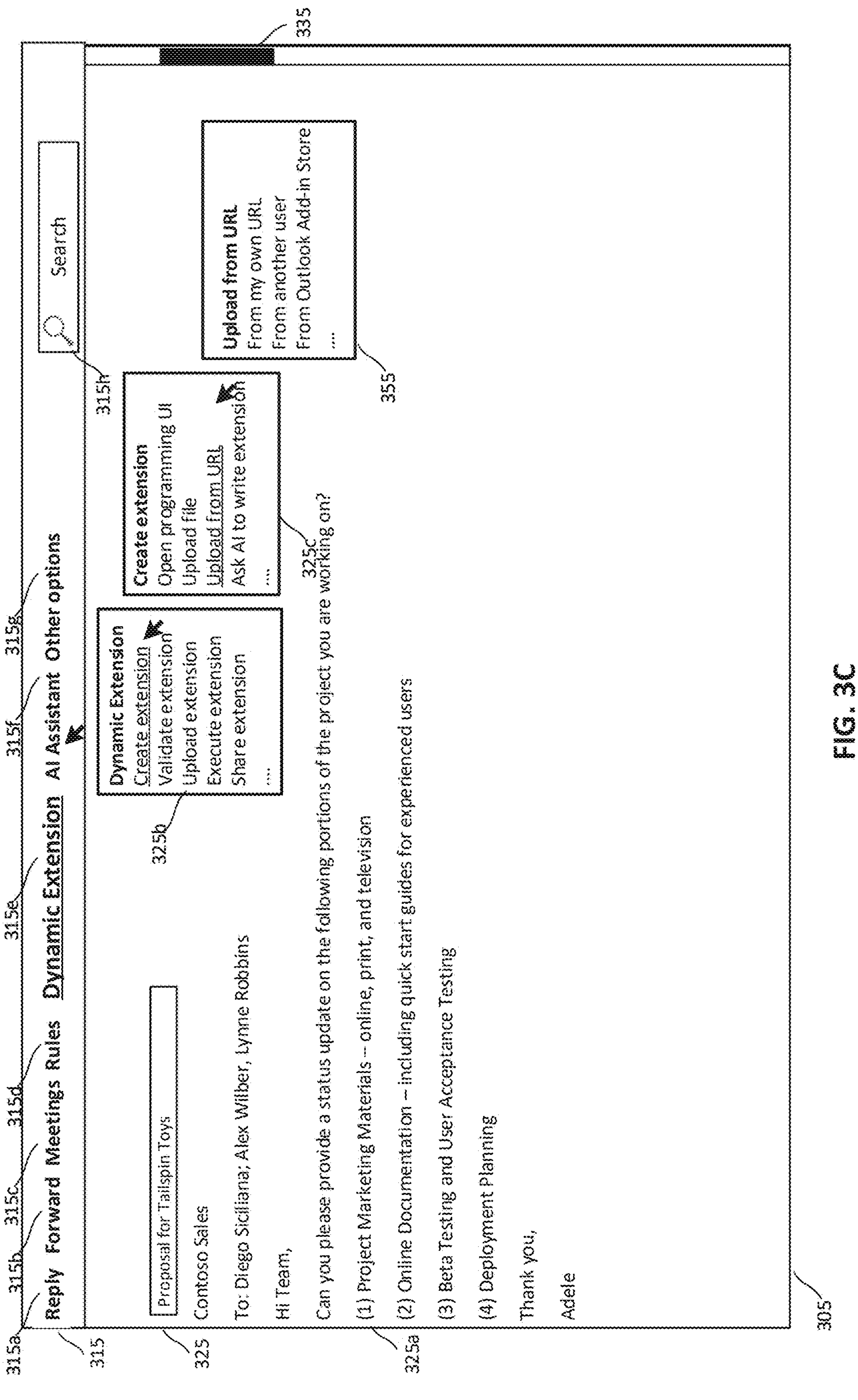

In FIG. 3B, upon a user selection of the option of Open programming UI, the content pane 325 shows a programmatic interface 345 that displays dynamic extension commands (e.g., Table 1) entered by a user. In FIG. 3C, upon a user selection of the option of Upload from URL, the content pane 325 shows an Upload from URL dropdown menu 355 with options of From my own URL, From another user, From Outlook Add-in Store, and the like.

Figure 3D:
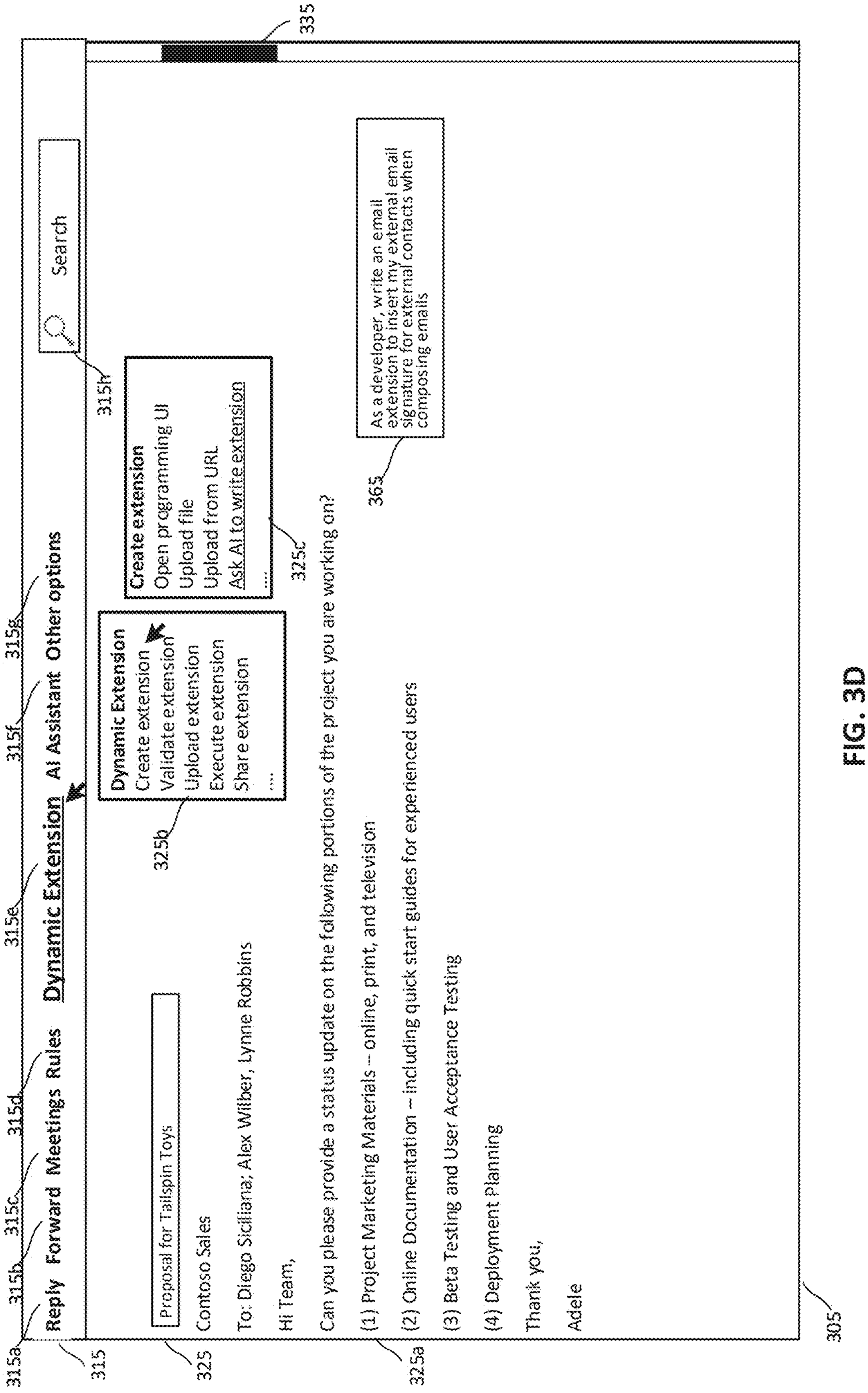

In FIG. 3D, upon a user selection of the option of Ask AI to write extension, the content pane 325 shows an AI chatbot box 365 in which the user can enter a natural language prompt (See Table 3) that describe a dynamic extension that the user would like to have automatically generated by the AI assistant 126 of the application services platform 110.

TABLE 3

| |
|---|
| As a developer, write an email extension to insert my external email signature for external contacts when composing emails |

Alternatively, the AI-Assistant button 315*f* can be selected to provide content generation functions, such as generating dynamic extension commands 225*a* for user without programmatic knowledge. In some implementations, the content pane 325 provides an AI chatbot box in which the user can enter prompts that describe content that the user would like to have automatically generated by the AI assistant 126 of the application services platform 110. The application submits the natural language prompt to the application services platform 110 and user information identifying the user of the application to the application services platform 110.

In some implementations, the dynamic extension system provides a feedback loop by augmenting thumbs up and thumbs down buttons for each AI-generated content item in the user interface 305. If the user dislikes a response, the dynamic extension system can ask why and use the input to improve the response. A thumbs down click could also prompt the user to indicate whether the response was too long, too short, missing information, and the like.

The user prompts, the response, and the user feedback are submitted to the application services platform 110 to generate another response using the AI assistant 126 and/or to improve the generative models. The AI-based content generation thus incorporates user feedback in real-time or in substantially real-time, and allows user inputs via intuitive user interfaces.

In some implementations, the application services platform 110 includes the moderation services 132 that analyze dynamic extension commands, user prompt(s), user feedbacks, and responses generated by the AI assistant 126, to ensure that potentially objectionable or offensive content is not generated or utilized by the application services platform 110.

If potentially objectionable or offensive content is detected in the user prompt(s), the user feedbacks, and the AI-generated responses, the moderation services 132 provides a blocked content notification to the client device 105 indicating that the dynamic extension commands, the prompt(s), the user data is blocked from forming the system prompt. In some implementations, the web portal 122 discards any user data that includes potentially objectionable or offensive content and passes any remaining content that has not been discarded to the web portal 122 to be provided as an input to the AI assistant 126. In other implementations, the AI assistant 126 discards any content that includes potentially objectionable or offensive content and passes any remaining content that has not been discarded to the generative models as an input.

The moderation services 132 can be implemented by a machine learning model trained to analyze the content of these various inputs and/or outputs to perform a semantic analysis on the content to predict whether the content includes potentially objectionable or offensive content. The moderation services 132 can perform another check on the content using a machine learning model configured to analyze the words and/or phrase used in content to identify potentially offensive language/image/sound. The moderation services 132 can compare the language used in the content with a list of prohibited terms/images/sounds including known offensive words and/or phrases, images, sounds, and the like. The moderation services 132 can provide a dynamic list that can be quickly updated by administrators to add additional prohibited terms/images/sounds. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services 132 may vary from implementation to implementation. If one or more of these checks determines that the textual content includes offensive content, the moderation services 132 can notify the application services platform 110 that some action should be taken.

In some implementations, the moderation services 132 generates a blocked content notification, which is provided to the client device 105. The native application 114 or the browser application 112 receives the notification and presents a message on a user interface of the application that the user prompt received by the web portal 122 could not be processed. The user interface provides information indicating why the blocked content notification was issued in some implementations. The user may attempt to refine a natural language prompt to remove the potentially offensive content. A technical benefit of this approach is that the moderation services 132 provides safeguards against both user-created and model-created content to ensure that prohibited offensive or potentially offensive content is not presented to the user in the native application 114 or the browser application 112.

As mentioned, the application services platform 110 complies with privacy guidelines and regulations that apply to the usage of user data included in the content to be semantically analyzed to ensure that users have control over how the application services platform 110 utilizes their data. The user is provided with an opportunity to opt into the application services platform 110 to allow the application services platform 110 to access the user data and enable the generative models to generate a response according to user consent. In some implementations, the first time that an application, such as the native application 114 or the browser application 112 presents the data analysis assistant to the user, the user is presented with a message that indicates that the user may opt into allowing the application services platform 110 to use user data included in the content to support the content generation functionality. The user may opt into allowing the application services platform 110 to access all or a subset of user data included in the content to be semantically analyzed in a video. Furthermore, the user may modify their opt-in status at any time by selectively opting into or opting out of allowing the application services platform 110 from accessing and utilizing user data from the content as a whole or individually.

Figure 4A:
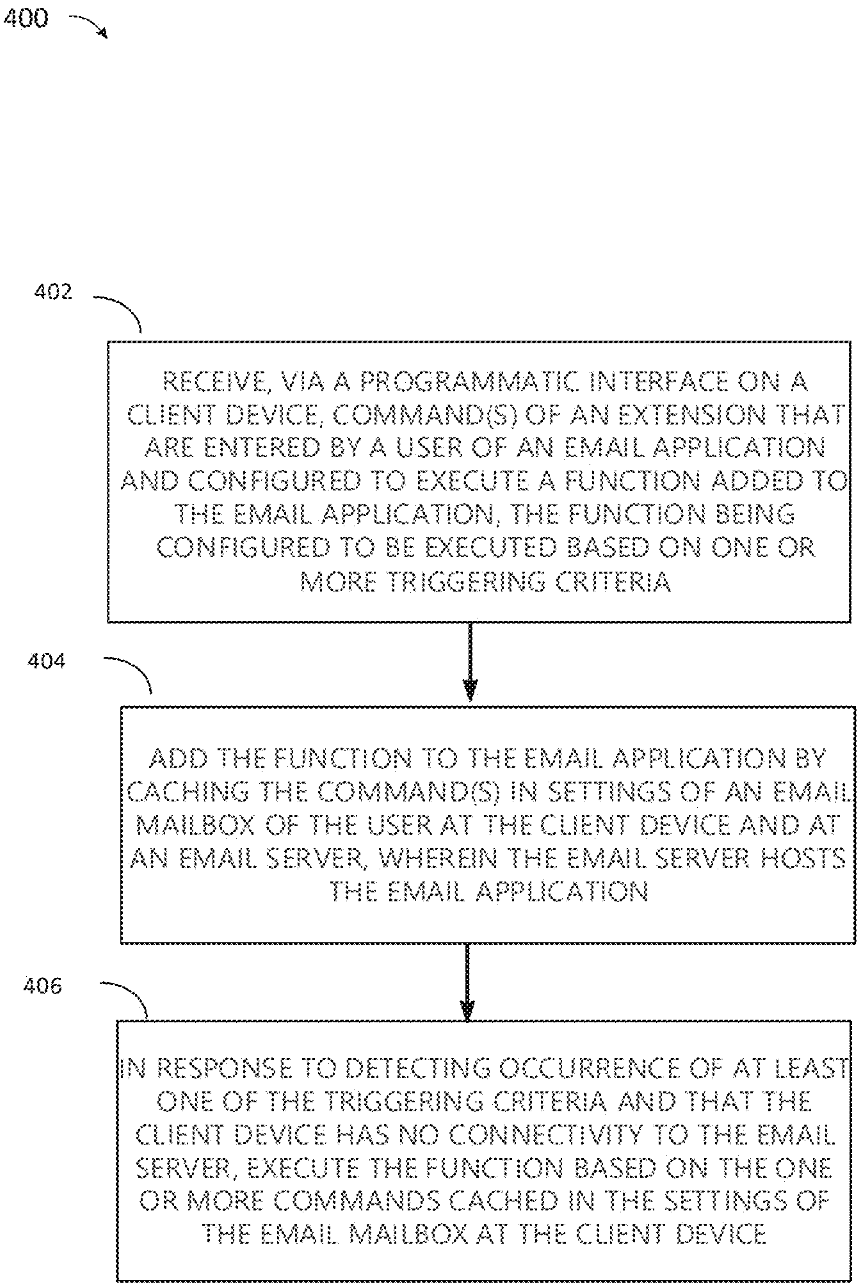
FIG. 4A is a flow chart of an example process for providing the email system dynamic extension creation via programming interfaces according to the techniques disclosed herein.
Figure 6:
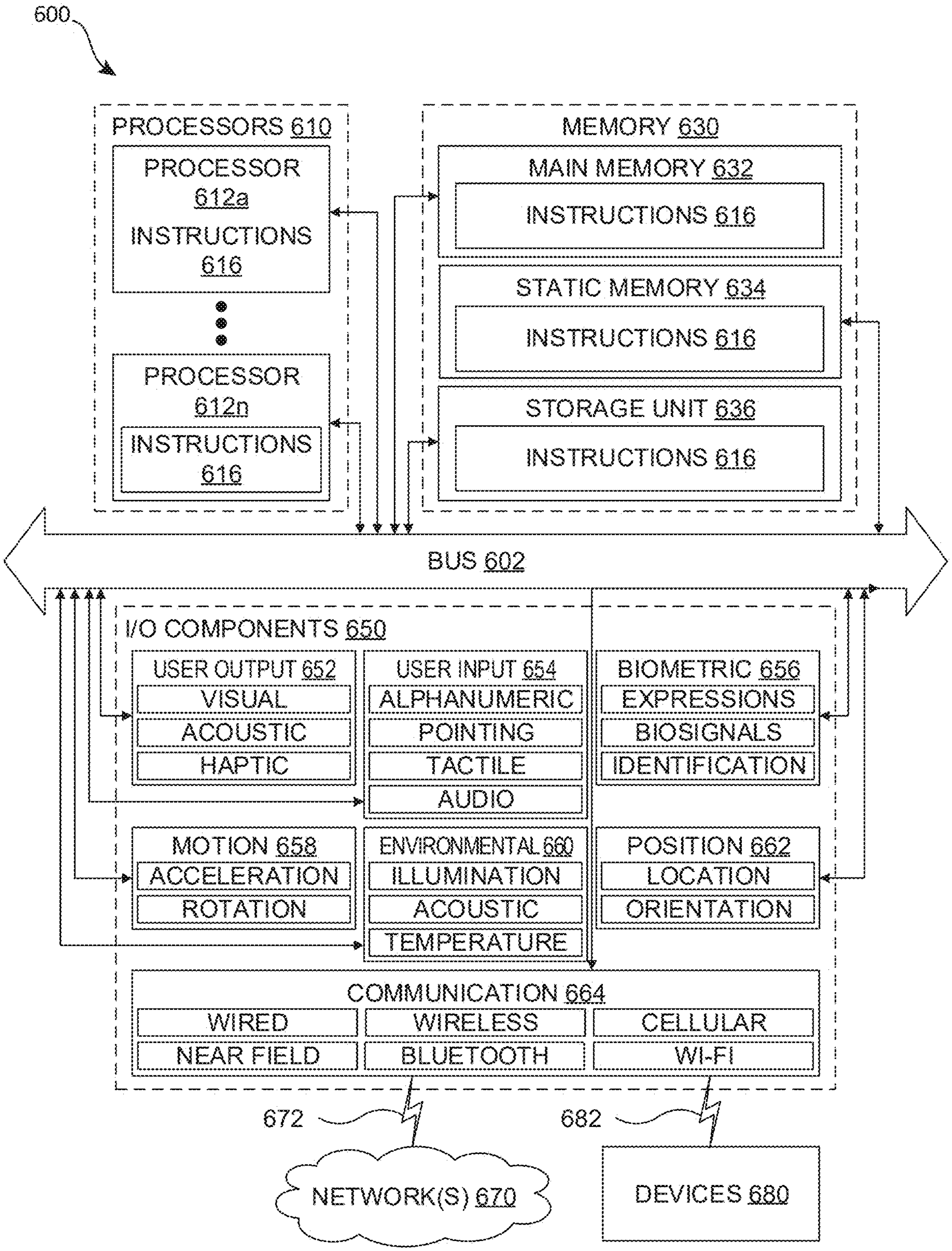
FIG. 6 is a block diagram showing components of an example machine configured to read instructions from a machine-readable medium and perform any of the features described herein.

FIG. 4A is a flow chart of an example process for providing the email system dynamic extension creation via programming interfaces according to the techniques disclosed herein. The process 400 can be implemented by the application services platform 110 or its components shown in the preceding examples. The process 400 may be implemented in, for instance, the example machine including a processor and a memory as shown in FIG. 6. As such, the application services platform 110 can provide means for accomplishing various parts of the process 400, as well as means for accomplishing embodiments of other processes described herein in conjunction with other components of the example computing environment 100. Although the process 400 is illustrated and described as a sequence of steps, it is contemplated that various embodiments of the process 400 may be performed in any order or combination and need not include all the illustrated steps.

In one embodiment, for example, in step 402 (e.g., the development stage), a programmatic interface (e.g., the programmatic interface 345 in FIG. 3B) on a client device (e.g., the client device 105) receives commands (e.g., the dynamic extension commands 225*a*, Table 1, Table 2, etc.) of an extension (e.g., the dynamic extension 225) that are entered by a user of an email application (e.g., Outlook®, Gmail®, and the like) and configured to execute a function (e.g., to fail emails containing some blocked word as in Table 1, or to change to external signature when recipient changes to external in Table 2) added to the email application, the function being configured to be executed based on one or more triggering criteria (e.g., when emails contain some blocked word, or when recipient changes to external). For example, the programmatic interface is associated with a text editor, a code editor, an integrated development environment (IDE), or an online IDE. The user can be a developer or an end user.

In step 404 (e.g., the deployment stage), a processor of the client device 105 adds the function to the email application by caching/saving the commands in settings of an email mailbox (e.g., the email application mailbox settings 232 in FIG. 2) of the user at the client device (e.g., the client device 105 in FIG. 2) and at an email server (e.g., the email server 107 in FIG. 2). The email server hosts the email application. In addition, the processor of the client device 105 can validate the commands (via manual testing, shell scripting, static code analysis tools, and the like).

In step 406 (e.g., the deployment stage), in response to detecting occurrence of at least one of the triggering criteria (e.g., the deployment stage) and that the client device has no connectivity to the email server, the processor of the client device 105 and/or the email client 114*a* executes the function based on the commands cached/saved in the settings of the email mailbox at the client device. In response to the adding and/or executing of the function, the processor of the client device 105 causes rendering of an indicator representing adding and/or executing the function on the email application interface on the client device.

In another embodiment, a processor of another client device (e.g., a smart phone of the user) receives the commands saved at the email server via an application interface of the email application on the other client device of the user, when the email application is activated on the other client device of the user (e.g., the deployment stage). For example, the other client device (e.g., an Android phone) runs on an operation system (e.g., Android) different from an operation system (e.g., iOS) of the client device.

In another embodiment, the processor of the client device 105 receives one or more updates to the commands via the programmatic interface on the client device as updated commands (e.g., the update stage); and caches/saves the updated commands in the settings of the email mailbox at the client device and at the email server. Again, the processor of another client device (e.g., a smart phone of the user) receives the updated commands saved at the email server via the application interface of the email application on the other client device (e.g., the smart phone) of the user (e.g., the update stage), when the email application is activated on the other client device of the user; and caches/saves the updated commands in the settings of the email mailbox at the other client device.

In yet another embodiment, the processor of the client device 105 receives additional commands of another extension enabling another function added to the email application (e.g., the push stage), via an application interface of the email application on the client device, when the email application is activated on the client device of the user, the other function being configured to be executed based on one or more other triggering criteria; and adds the other function to the email application by caching/saving the additional commands in the settings of the email mailbox at the client device. The additional commands are generated via a programmatic interface associated with the email server by an email administrator associated with the email application, saved at the email server, and pushed to the client device via a network. By analogy, the processor of the client device 105 receives, a the communication interface on the client device, one or more updates to the additional commands (e.g., an update stage after the push stage), and the one or more updates to the additional commands are generated via the programmatic interface on the other device by the email administrator, and pushed to the client device via the network. For example, the additional commands are saved as a part of an email policy in a personal or group mailbox at the email server.

Figure 4B:
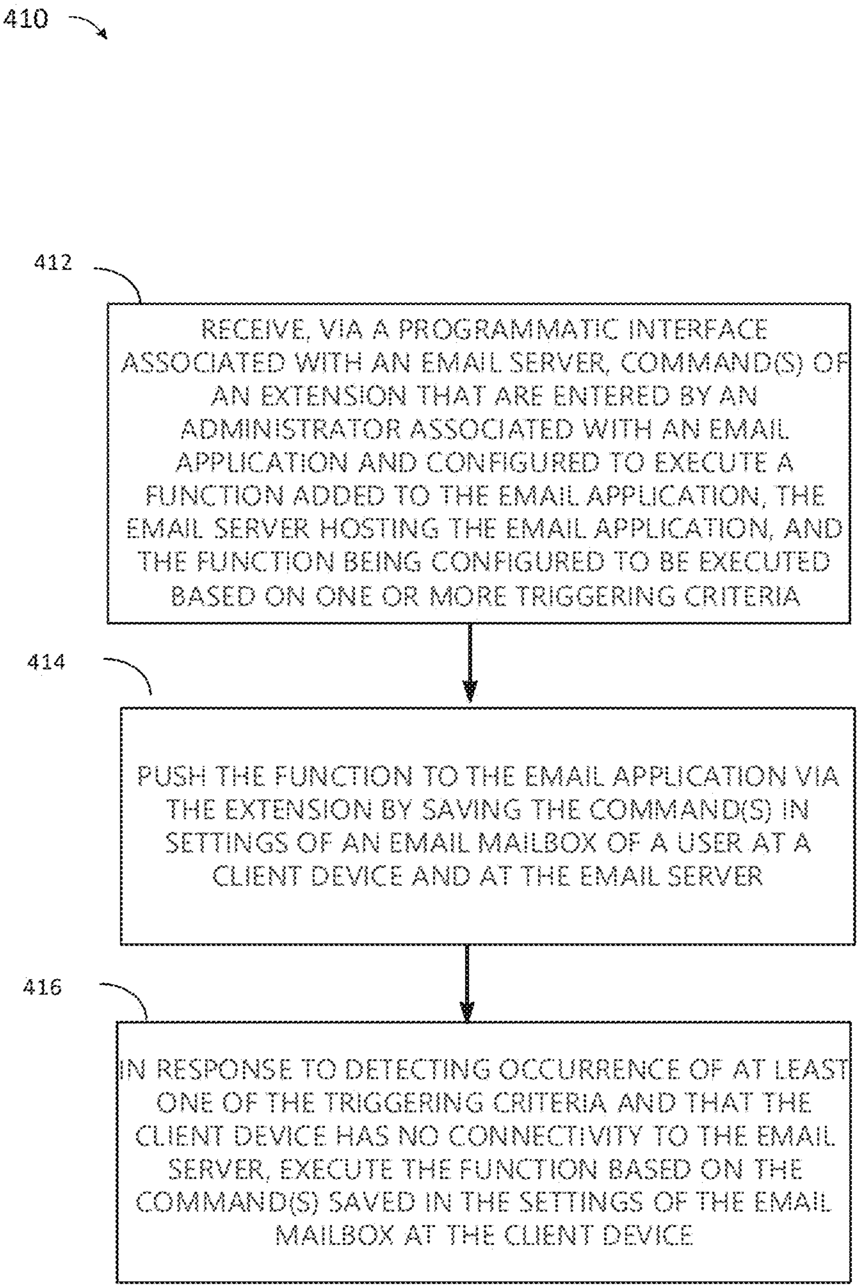
FIG. 4B is a flow chart of an example process for pushing an email system dynamic extension to client device(s) by an email administrator according to the techniques disclosed herein.

FIG. 4B is a flow chart of an example process for pushing an email system dynamic extension to client device(s) by an email administrator according to the techniques disclosed herein. The process 410 can be implemented by the application services platform 110 or its components shown in the preceding examples. The process 410 may be implemented in, for instance, the example machine including a processor and a memory as shown in FIG. 6. As such, the application services platform 110 can provide means for accomplishing various parts of the process 410, as well as means for accomplishing embodiments of other processes described herein in conjunction with other components of the example computing environment 100. Although the process 410 is illustrated and described as a sequence of steps, it is contemplated that various embodiments of the process 410 may be performed in any order or combination and need not include all the illustrated steps.

In one embodiment, for example, in step 412 (e.g., the push stage), a programmatic interface (e.g., similar to the programmatic interface 345 in FIG. 3B) associated with an email server (e.g., the email server 107 in FIG. 2) receives one or more commands (e.g., the dynamic extension commands 225*a*, Table 1, Table 2, etc.) of an extension (e.g., the dynamic extension 225) that are entered by an administrator associated with an email application (e.g., Outlook®, Gmail®, and the like) and configured to execute a function (e.g., to fail emails containing some blocked word as in Table 1, or to change to external signature when recipient changes to external in Table 2) added to the email application, the email server hosting the email application, and the function being configured to be executed based on one or more triggering criteria (e.g., when emails contain some blocked word, or when recipient changes to external).

In step 414, the email server pushes the function to the email application via the extension by caching/saving the one or more commands in settings of an email mailbox of a user (e.g., the email application mailbox settings 232 in FIG. 2) at a client device (e.g., the client device 105 in FIG. 2) and at the email server. For instance, the one or more commands are saved as a part of an email policy in a personal or group mailbox at the email server.

In step 416, in response to detecting occurrence of at least one of the triggering criteria (e.g., the deployment stage) and that the client device has no connectivity to the email server, the processor of the client device 105 and/or the email client 114*a* executes the function based on the one or more commands cached/saved in the settings of the email mailbox at the client device.

In another embodiment, the email server receives, via the programmatic interface, one or more updates to the one or more commands that are entered by the administrator, and pushes the one or more updates to the client device by caching/saving the one or more updates in the settings of the email mailbox of the user at the client device and at the email server.

In yet another embodiment, the email server pushes the one or more commands saved at the email server, via an application interface of the email application on another client device of the user (e.g., a smart phone of the user), to the other client device of the user, when the email application is activated on the other client device of the user. For example, the other client device runs on an operation system (e.g., Android) different from an operation system (e.g., iOS) of the client device.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
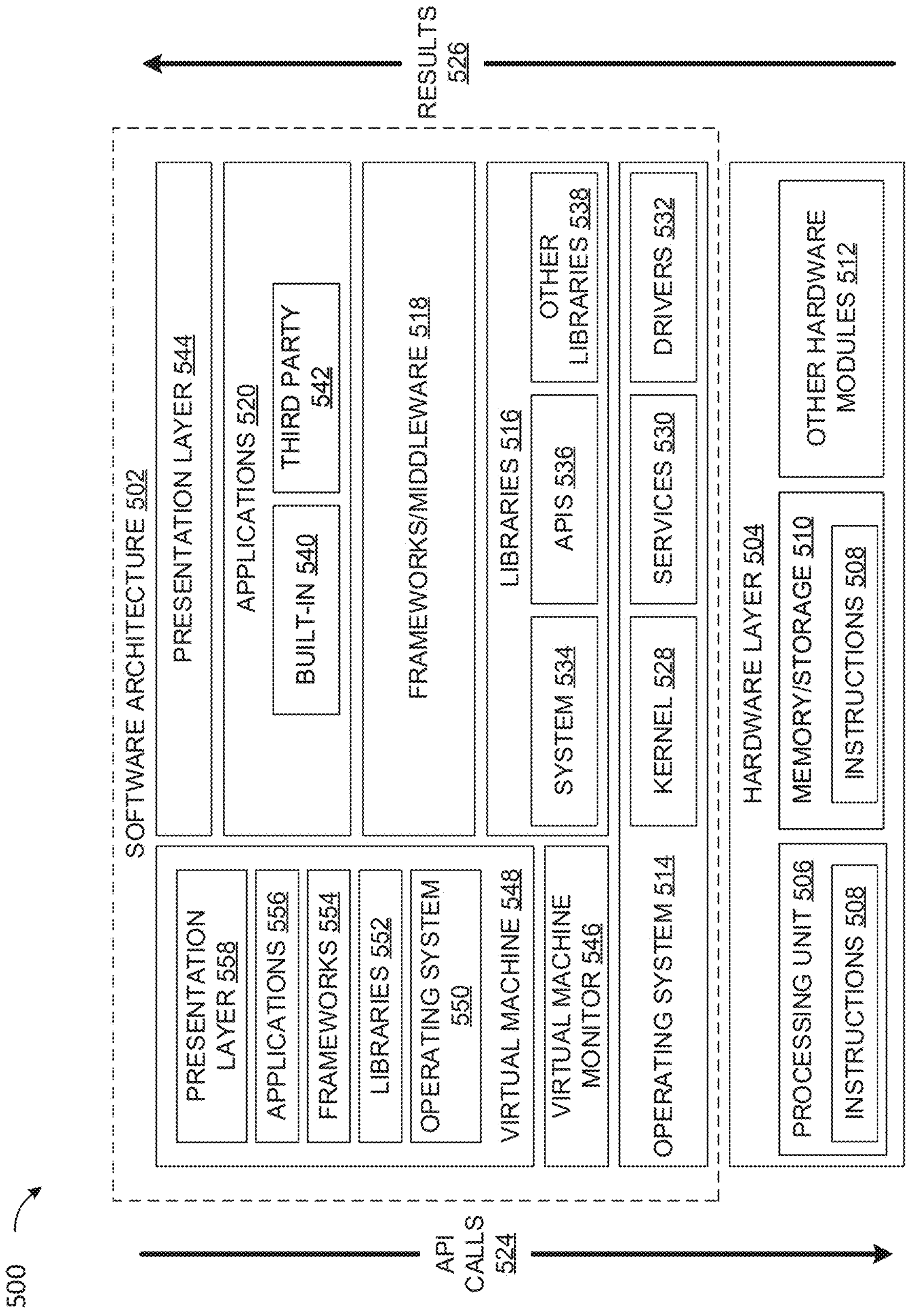
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may be executed on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a neural processing unit (NPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a machine-readable storage medium storing executable instructions that, when executed, cause the processor alone or in combination with other processors to perform operations of:

receiving, via a programmatic interface on a client device, one or more commands of an extension that are entered by a user of an email application and configured to execute a function added to the email application, the function being configured to be executed based on one or more triggering criteria;

adding the function to the email application by saving one copy of the one or more commands in settings of an email mailbox of the user in a user profile storage at the client device and another copy of the one or more commands in the settings of the email mailbox of the user at an email server, wherein the settings of the email mailbox of the user include user email account settings, and the email server hosts the email application; and in response to detecting occurrence of at least one of the triggering criteria and that the client device has no connectivity to the email server, executing the function based on the one or more commands saved in the settings of the email mailbox at the client device.

2. The data processing system of claim 1, wherein the machine-readable storage medium further includes instructions configured to cause the processor alone or in combination with other processors to perform operations of:

receiving the one or more commands saved at the email server via an application interface of the email application on another client device of the user, when the email application is activated on the other client device of the user.

3. The data processing system of claim 2, wherein the other client device runs on an operation system different from an operation system of the client device.

4. The data processing system of claim 2, wherein the machine-readable storage medium further includes instructions configured to cause the processor alone or in combination with other processors to perform operations of:

receiving one or more updates to the one or more commands via the programmatic interface on the client device as one or more updated commands; and saving the one or more updated commands in the settings of the email mailbox at the client device and at the email server.

5. The data processing system of claim 4, wherein the machine-readable storage medium further includes instructions configured to cause the processor alone or in combination with other processors to perform operations of:

receiving the one or more updated commands saved at the email server via the application interface of the email application on the other client device of the user, when the email application is activated on the other client device of the user; and saving the one or more updated commands in the settings of the email mailbox at the other client device.

6. The data processing system of claim 1, wherein the machine-readable storage medium further includes instructions configured to cause the processor alone or in combination with other processors to perform operations of:

receiving one or more additional commands of another extension enabling another function added to the email application, via an application interface of the email application on the client device, when the email application is activated on the client device of the user, the other function being configured to be executed based on one or more other triggering criteria; and adding the other function to the email application by saving the one or more additional commands in the settings of the email mailbox at the client device, wherein the one or more additional commands are generated via a programmatic interface associated with the email server by an email administrator associated with the email application, saved at the email server, and pushed to the client device via a network.

7. The data processing system of claim 6, wherein the machine-readable storage medium further includes instructions configured to cause the processor alone or in combination with other processors to perform at least one of the operations of:

receiving, via a communication interface on the client device, one or more updates to the one or more additional commands, wherein the one or more updates to the one or more additional commands are generated via the programmatic interface on the other device by the email administrator, and pushed to the client device via the network.

8. The data processing system of claim 6, wherein the one or more additional commands are saved as a part of at least one email policy in a personal or group mailbox at the email server.

9. The data processing system of claim 1, wherein the machine-readable storage medium further includes instructions configured to cause the processor alone or in combination with other processors to perform operations of:

in response to detecting occurrence of at least one of the triggering criteria and that the client device is connected to the email server, executing the function based on the one or more commands saved in the settings of the email mailbox at the email server, the function being executed without creating a manifest or hosting extension core functionality files in the email server, wherein the programmatic interface is associated with a text editor, a code editor, an integrated development environment (IDE), or an online IDE.

10. A method comprising:

receiving, via a programmatic interface associated with an email server, one or more commands of an extension that are entered by an administrator associated with an email application and configured to execute a function added to the email application, the email server hosting the email application, and the function being configured to be executed based on one or more triggering criteria;

pushing the function to the email application via the extension by saving one copy of the one or more commands in settings of an email mailbox of a user in a user profile storage at a client device and another copy of the one or more commands in the settings of the email mailbox of the user at the email server, wherein the settings of the email mailbox of the user include user email account settings; and in response to detecting occurrence of at least one of the triggering criteria and that the client device has no connectivity to the email server, executing the function based on the one or more commands saved in the settings of the email mailbox at the client device.

11. The method of claim 10, further comprising:

receiving, via the programmatic interface on the email server, one or more updates to the one or more commands that are entered by the administrator; and pushing the one or more updates to the client device by saving the one or more updates in the settings of the email mailbox of the user at the client device and at the email server.

12. The method of claim 10, wherein the one or more commands are saved as a part of an email policy in a personal or group mailbox at the email server.

13. The method of claim 10, further comprising:

pushing the one or more commands saved at the email server to another client device of the user, via an application interface of the email application on the other client device of the user, when the email application is activated on the other client device of the user.

14. The method of claim 13, wherein the other client device runs on an operation system different from an operation system of the client device.

15. A non-transitory computer readable medium on which are stored instructions that, when executed, cause a programmable device to perform functions of:

receiving, via a generative artificial intelligence (AI) chat interface on a client device, a natural language instruction that is entered by a user of an email application, the natural language instruction requesting to write one or more commands of an extension configured to execute a function added to the email application, the function being configured to be executed based on one or more triggering criteria;

prompting a generative AI model to process the natural language instruction and output the one or more commands;

adding the function to the email application by saving one copy of the one or more commands in settings of an email mailbox of the user in a user profile storage at the client device and another copy of the one or more commands in the settings of the email mailbox of the user at an email server, wherein the settings of the email mailbox of the user include user email account settings, and the email server hosts the email application; and in response to detecting occurrence of at least one of the triggering criteria, executing the function based on the one or more commands saved in the settings of the email mailbox at the client device.

16. The non-transitory computer readable medium of claim 15, wherein the instructions when executed, further cause the programmable device to perform functions of:

receiving the one or more commands saved at the email server via an application interface of the email application on another client device of the user, when the email application is activated on the other client device of the user.

17. The non-transitory computer readable medium of claim 16, wherein the other client device runs on an operation system different from an operation system of the client device.

18. The non-transitory computer readable medium of claim 16, wherein the instructions when executed, further cause the programmable device to perform functions of:

receiving one or more updates to the one or more commands via the generative AI chat interface on the client device as one or more updated commands; and saving the one or more updated commands in the settings of the email mailbox at the client device and at the email server.

19. The non-transitory computer readable medium of claim 18, wherein the instructions when executed, further cause the programmable device to perform functions of:

receiving the one or more updated commands saved at the email server via the application interface of the email application on the other client device of the user, when the email application is activated on the other client device of the user; and saving the one or more updated commands in the settings of the email mailbox at the other client device.

20. The non-transitory computer readable medium of claim 15, wherein the instructions when executed, further cause the programmable device to perform functions of:

in response to detecting occurrence of at least one of the triggering criteria and that the client device is connected to the email server, executing the function based on the one or more commands saved in the settings of the email mailbox at the email server, the function being executed without creating a manifest or hosting extension core functionality files in the email server.

* * * * *